(12) United States Patent
Chiang et al.

(10) Patent No.: US 12,285,971 B2
(45) Date of Patent: Apr. 29, 2025

(54) POWER DEVICE IN WHEEL

(71) Applicant: Chameleon Corporation, New Taipei (TW)

(72) Inventors: Yueh-Feng Chiang, Taipei (TW); Kuo-Ching Chiang, New Taipei (TW)

(73) Assignee: Metaone Corporation, Taipei (TW)

( * ) Notice: Subject to any disclaimer, the term of this patent is extended or adjusted under 35 U.S.C. 154(b) by 389 days.

(21) Appl. No.: 17/719,395

(22) Filed: Apr. 13, 2022

(65) Prior Publication Data

US 2022/0371364 A1 Nov. 24, 2022

(30) Foreign Application Priority Data

| May 18, 2021 | (TW) | 110118167 |
| May 18, 2021 | (TW) | 110118168 |
| Aug. 27, 2021 | (TW) | 110131870 |
| Oct. 8, 2021 | (TW) | 110137600 |

(51) Int. Cl.
    *B60B 27/00* (2006.01)
    *H02K 1/2789* (2022.01)
    *H02K 7/18* (2006.01)
    *H02K 21/24* (2006.01)

(52) U.S. Cl.
    CPC ....... *B60B 27/0047* (2013.01); *H02K 1/2789* (2022.01); *H02K 7/1846* (2013.01); *H02K 21/24* (2013.01)

(58) Field of Classification Search
    CPC .......... B60B 27/0047; B60B 2900/931; H02K 1/2789; H02K 1/2795; H02K 21/24; H02K 7/1846
    See application file for complete search history.

(56) References Cited

U.S. PATENT DOCUMENTS

| 3,979,619 A * | 9/1976 | Whiteley | H02K 23/04 |
| | | | 310/154.06 |
| 6,720,688 B1 * | 4/2004 | Schiller | H02K 1/2796 |
| | | | 310/58 |
| 9,337,709 B2 * | 5/2016 | Hashiba | H02K 15/03 |
| 9,899,886 B2 * | 2/2018 | Sullivan | H02K 1/278 |
| 10,637,338 B2 * | 4/2020 | Kelly | H02K 16/00 |
| 2013/0049512 A1 * | 2/2013 | Jung | H02K 21/24 |
| | | | 310/156.36 |
| 2015/0015108 A1 * | 1/2015 | Hashiba | H02K 21/24 |
| | | | 29/598 |
| 2019/0103791 A1 * | 4/2019 | Goel | H02K 1/2713 |

* cited by examiner

*Primary Examiner* — Naishadh N Desai
(74) *Attorney, Agent, or Firm* — Chih Feng Yeh; Yongjean Consulting Inc.

(57) ABSTRACT

An electromagnetic induction hub includes a first disc having a first magnet, a second disc having a second magnet, a coil disc formed between the first disc and the second disc, a bearing penetrates the first disc, the second disc and the coil disc.

20 Claims, 13 Drawing Sheets

POWER DEVICE IN WHEEL

CROSS-REFERENCE STATEMENT

The present application is based on, and claims priority from, Taiwan Patent Application Serial Number 110118167, 110118168, 110131870, and 110137600, filed May 18 2021 May 18 2021 Aug. 27 2021, and Oct. 8 2021 respectively, the disclosures of which are hereby incorporated by reference herein in their entirety.

TECHNICAL FIELD

The present invention relates to a wheel hub, and more particularly, a wheel hub with electromagnetic induction.

RELATED ART

In recent years, with the increase of environmental consciousness, electric vehicles have been gradually promoted by experts, scholars and government to replace the traditional internal combustion engine (ICE) vehicles. As far as the current market is concerned, although electric vehicles have been sold on the market, their biggest disadvantages include insufficient endurance, longer charging time, and the setting of charging stations is still not popular. As a result, the acceptance of electric vehicles by the general public is still far from that of internal combustion engine vehicles. Therefore, the improvement of electric vehicles at present, in addition to proposing hybrid vehicles with hybrid power, it also improves the charging speed of batteries.

In the prior art, the common configuration of rotor and stator is to set them in a concentric circle based on the same rotating shaft, that is, the inner ring is a coil and the outer ring is a magnet. However, the volume of this prior art is cylindrical, which is too large to be configured in the hub.

According to Faraday's law of electromagnetic induction, the induced current generated by the generator is directly proportional to the size of the magnetic field. When the magnetic flux of the coil in the magnetic field changes more, the induced current can be generated more. Therefore, if you want to improve the energy conversion efficiency of the existing generator, the previous technology needs to be improved.

SUMMARY OF THE INVENTION

To achieve the above purpose, the invention proposes an electromagnetic induction hub without laminated steel sheet, which can be applied to the current electric vehicle or oil-electric hybrid vehicle by configuring the coil winding of copper wire as a suitable coil winding stack, improving the arrangement of coils and magnets, so as to improve the power generation efficiency. The invention enables the existing vehicle to keep the power generation efficiency during driving due to the rotation of the wheel hub or rotating shaft, and further improves the endurance of the vehicle.

The invention proposes an electromagnetic induction hub, comprising a hub housing structure; a rotating shaft penetrating the hub housing structure; a first disc with a plurality of first permanent magnets; a second disc configured to a first side of the first disc, wherein the second disc has a first coil; and a third disc configured to a second side of the second disc, wherein the second disc has a plurality of second permanent magnets, wherein the rotating shaft penetrates the first disc, the second disc and the third disc; wherein N poles and S poles of the plurality of first permanent magnets are arranged alternately, and N poles and S poles of the plurality of second permanent magnets are arranged alternately. When the first disc is a stator, the second disc is a rotor. When the first disc is a rotor, the second disc is a stator.

In one preferred embodiment, the first disc is configured on a first side of the hub housing structure, and the third disc is configured on a second side of the hub housing structure. The electromagnetic induction hub further comprises a second coil or a heat dissipation device configured on the second disc. The first disc is configured on a first side of the hub housing structure, and the third disc is configured on a second side of a hub support structure. The first disc and the second disc are asymmetric to the rotating shaft for facilitating to configure a braking system. N poles of the plurality of first permanent magnets one-to-one correspond to S poles of the plurality of second permanent magnets, and S poles of the plurality of first permanent magnets one-to-one correspond to N poles of the plurality of second permanent magnets.

An electromagnetic induction hub comprises a hub housing structure; a rotating shaft penetrating the hub housing structure; a first disc configured to the rotating shaft, wherein the first disc has a plurality of first coils; a second disc configured to the rotating shaft and a first side of the first disc, wherein the second disc has a plurality of first permanent magnets; and a third disc configured to the rotating shaft and a second side of the second disc, wherein the second disc has a plurality of second coils; wherein N poles and S poles of the plurality of permanent magnets are arranged alternately. When the first disc is a stator, the second disc is a rotor. When the first disc is a rotor, the second disc is a stator.

An electromagnetic induction hub comprises a hub housing structure including a plurality of first permanent magnets on a first side and a plurality of second permanent magnets on a second side; a rotating shaft penetrating the hub housing structure; a coil disc configured to the rotating shaft within the hub housing structure, wherein the coil disc has a first coil; and wherein N poles and S poles of the plurality of first permanent magnets are arranged alternately, and N poles and S poles of the plurality of second permanent magnets are arranged alternately; wherein the plurality of first permanent magnets and the plurality of second permanent magnets are rotated with the hub housing structure. The coil disc further comprises a second coil or a heat dissipation device. The coil disc is asymmetric to the rotating shaft. N poles of the plurality of first permanent magnets one-to-one correspond to S poles of the plurality of second permanent magnets, and S poles of the plurality of first permanent magnets one-to-one correspond to N poles of the plurality of second permanent magnets.

The invention provides an electromagnetic induction hub, which is applied for tires. The induction power generation device comprises a magnetic assembly combined with a coil assembly. A rotating shaft penetrates and connects to the magnetic assembly and the coil assembly, so that the coil assembly can rotate relative to the magnetic assembly. In other words, one layer of rotor unit is matched with one layer of stator unit, and its configuration forms a one-to-one matching structure.

According to the invention, it proposes an electromagnetic induction hub. The electromagnetic induction power generation device can be configured on the tire hub, and the electromagnetic induction power generation device comprises two magnetic assemblies matched with a coil assembly. A rotating shaft penetrates and connects to the magnetic assemblies and the coil assembly so that the coil assembly can rotate relative to the magnetic assemblies. The magnetic assembly comprises a permanent magnet configured in a base. The coil assembly comprises a plurality of coils, which are arranged radially and at equal radial angles. This embodiment is arranged to form a sandwich structure.

According to the embodiment of the invention, another sandwich structure comprises two coil assemblies matched with one magnetic assembly, and a rotating shaft penetrates and connects to the magnetic assembly and the coil assemblies. When the vehicle is moving, the rotating shaft (hub) is then driven to rotate by the inertia of tire rotation. The stator base is a cylindrical base with a central hole to pass through the rotating shaft, the stator base has a space for holding coils, each coil is wound by enameled wires, and the magnetic poles of adjacent permanent magnets are alternately arranged in a manner of opposite polarity. Each permanent magnet is configured so that their respective vertical bisector has an equal radial angular distribution with the base.

BRIEF DESCRIPTION OF THE DRAWINGS

The components, characteristics and advantages of the present invention may be understood by the detailed descriptions of the preferred embodiments outlined in the specification and the drawings attached.

DETAILED DESCRIPTION

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims. It should be noted that the wheel hub power generation device described in the invention can be, but is not limited to, apply for electric vehicles, oil-electric hybrid vehicles, or self-propelled vehicles with manual pedal output power. Those skilled in the art can apply and modify it according to the needs of the application after reading the contents of the invention.

The terms "first", "second", etc. herein do not specifically refer to order or order, nor to limit the invention, but only to distinguish elements or operations described in the identical technical terms.

As used herein, "connection" or "electrical coupling" can refer to the physical connection or electrical connection between two or more elements directly or indirectly, and "connection" or "electrical coupling" can also refer to the operation or action between two or more elements.

Figure 1:
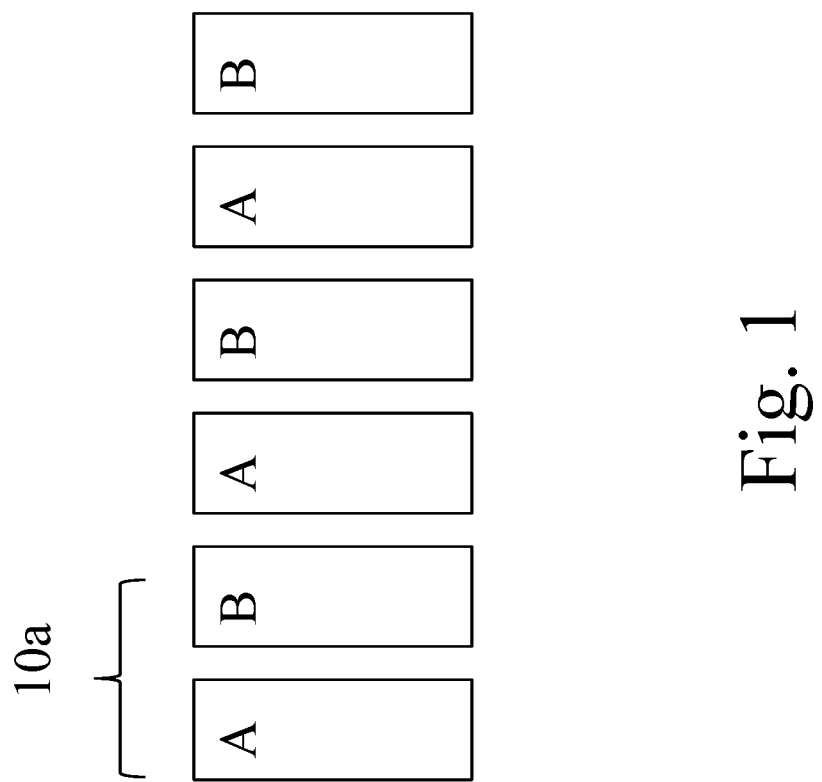
FIG. 1 illustrates a diagram according to a preferred embodiment of the present invention.

Referring to FIG. 1, in an embodiment of the present invention, an electromagnetic induction power generation device 10a is disclosed. The minimum unit of the electromagnetic induction power generation device 10a includes a coil assembly and a matched magnetic assembly, and the electromagnetic induction power generation device 10a can have a plurality of minimum units. FIG. 1 shows one-to-one configuration of the invention, with a coil assembly matching a magnetic assembly. If the coil assembly is marked as A and the magnetic assembly is marked as B, its configuration belongs to one-to-one AB configuration. The disadvantage of AB architecture is that the coil is configured in a single-surface magnetic field, and the efficiency is low due to the divergence and non-uniformity of the magnetic field.

Figure 2B:
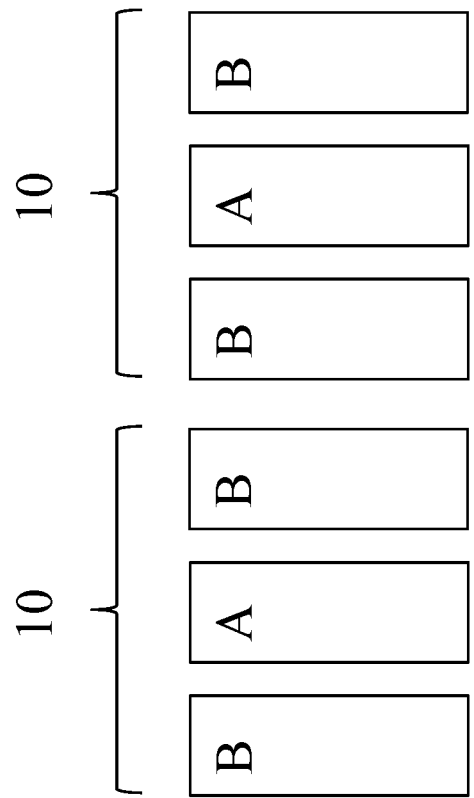
FIGS. 2A and 2B illustrates a diagram according to another preferred embodiment of the present invention.
Figure 2A:
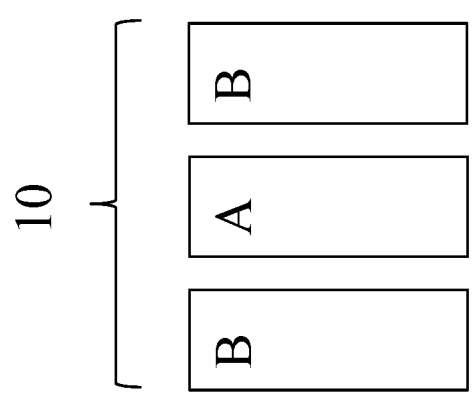

In order to improve the above AB configuration, in another embodiment of the invention, referring to FIG. 2A and FIG. 2B, the minimum unit of the electromagnetic induction device 10 includes a two-to-one matching with two magnetic assemblies (components) B and one coil assembly (component) A, and the electromagnetic induction device 10 can have a plurality of minimum units. In other words, in such embodiment of the present invention, two magnetic assemblies B can be used as a rotor unit and one coil assembly A can be matched as a stator unit; vice versa. If the coil assembly is marked as A and the magnetic assembly is marked as B, its configuration belongs to BABBAB configuration, as shown in FIG. 2B. The power generation efficiency is directly proportional to the vertical magnetic field strength. The BAB sandwich configuration generates a vertical magnetic field that penetrates through the coils, thereby generating higher electricity.

Figure 2D:
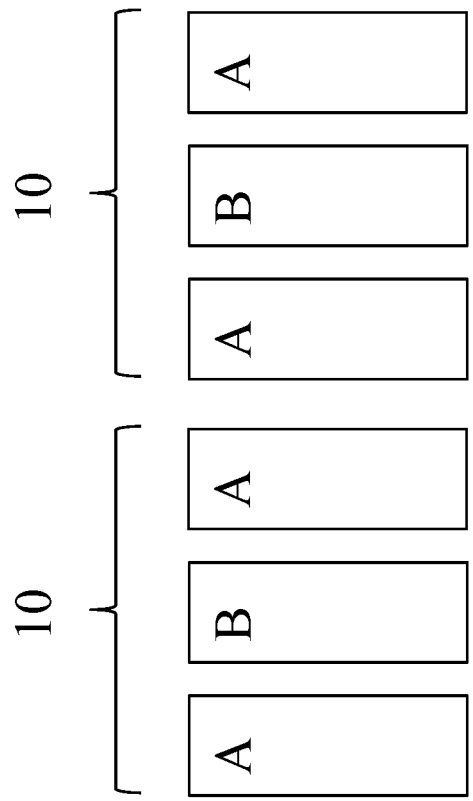
FIGS. 2C and 2D illustrates a diagram according to yet another preferred embodiment of the present invention.
Figure 2C:
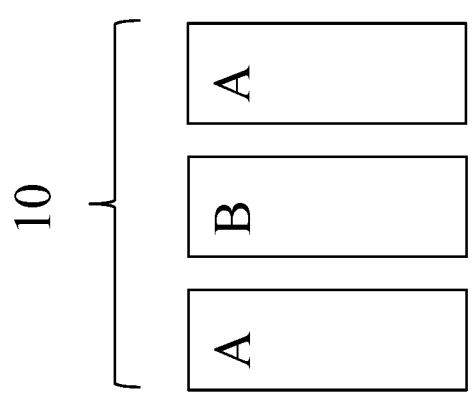

In order to improve the deficiency of the above AB configuration, referring to FIG. 2C and FIG. 2D, in the alternative embodiment of the invention, the electromagnetic induction power generation device 10 is disclosed. The minimum unit of the electromagnetic induction power generation device 10 includes one magnetic assembly (component) B and two coil assemblies (components) A, and the electromagnetic induction power generation device 10 can have a plurality of minimum units. There is a one-to-two matching between the magnetic assembly B and the coil assembly A. In other words, in this embodiment of the invention, one magnetic component B combines with two coil assemblies A; one is the stator and the other is the rotor. If the coil assembly is marked as A and the magnetic assembly is marked as B, its configuration also belongs to ABAABA configuration, as shown in FIG. 2D. The power generation efficiency is directly proportional to the vertical magnetic field strength. BABBAB configuration can form an axial vertical magnetic field, so as to obtain the optimized magnetic flux density, which is conducive to improve the power generation efficiency and improve the shortcomings of AB configuration (architecture). Further, ABA configuration may achieve two-times power of the AB configuration. However, the AB configuration cannot offer vertical magnetic field, therefore, the efficiency of the ABA is also lower than the one of the BAB configuration which generates the vertical magnetic field.

Figure 3A:
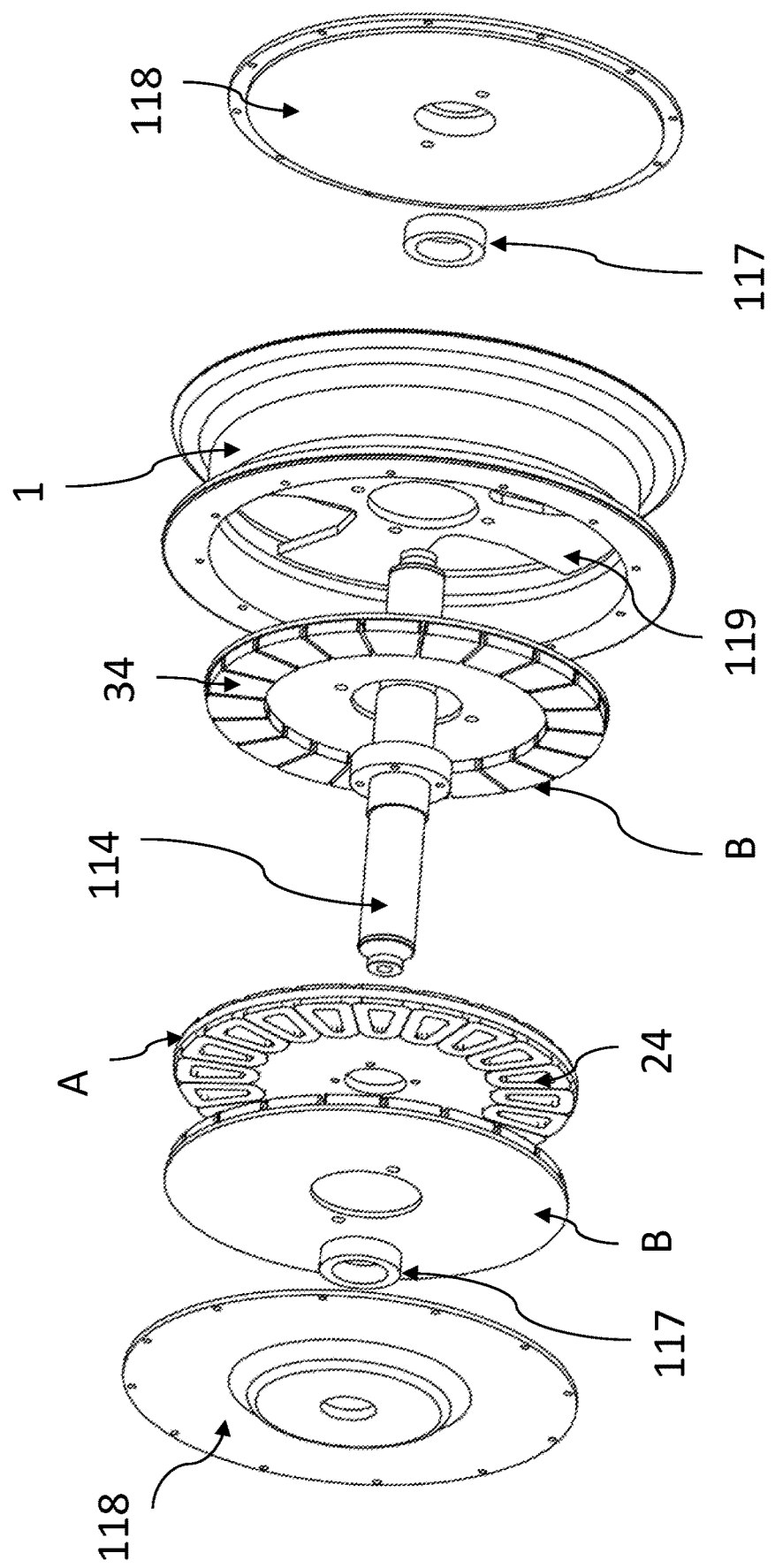
FIG. 3A illustrates a diagram of coil assembly A and magnetic assemblies B configured on hub housing structure.

Please refer to FIG. 3A, which shows a schematic structure of an electromagnetic induction hub 1, which can be configured on vehicle tires (not shown). Both sides of the hub 1 are provided with a hub housing structure 118 to accommodate an electromagnetic induction power generation device. The hub housing structure 118 can be integrated with the electromagnetic induction power generation device. The electromagnetic induction power generation device is configured on the wheel hub of the tire. When there is an induction power generation device with AB configuration, the induction power generation device includes a magnetic assembly B and a coil assembly A. When there is an induction power generation device with BAB configuration, the induction power generation device includes two magnetic assemblies B and one coil assembly A. Referring to FIG. 3A, a rotating shaft 114 penetrates and connects the magnetic assembly B and the coil assembly A, so that the magnetic assembly B relative to the coil assembly A drives the rotating shaft 114 (hub) to be rotated according to the inertia of tire rotation when the vehicle is moving, so that the coil assembly A and the magnetic assembly B can be rotated relative to each other. The magnetic assembly B comprises at least one (or a plurality of) permanent magnets 34, and the coil assembly A comprises a plurality of coils 24, so that the coil assembly A can cut the line of magnetic field of the permanent magnet 34 to form the change of magnetic flux and generate induced current during the relative rotation between the magnetic assembly B and the coil assembly A. Among them, the coil assembly A can be set as a stator and the magnetic assembly B as a rotor; in another embodiment, the coil assembly A can also be set as a rotor and the magnetic assembly B as a stator. In one embodiment, the coil assembly A is a stator, the magnetic assembly B is a rotor, and the coil assembly A is fixed to the rotating shaft 114. Therefore, the two magnetic assemblies B are respectively fixed to the hub housing structure 118, or the two magnetic assemblies B are respectively fixed to the hub housing structure 118 and a support structure 119 in the hub 1, depending on the design requirements. If the magnetic assembly B is a rotor, the magnetic assembly B is connected to the rotating shaft 114 through a bearing 117.

Referring to FIG. 3A, it shows an induction power generation device with BAB (or ABA) configuration. The induction power generation device includes two magnetic assemblies B matching one coil assembly A (or one magnetic assembly B matching two coil assemblies A). A rotating shaft 114 penetrates and connects the magnetic assembly B and the coil assembly A, so that the magnetic assembly B relative to the coil assembly A drives the rotating shaft 114 to be rotated based on the inertia of tire rotation when the vehicle is moving, so that the coil assembly A and the magnetic assembly B can be rotated relative to each other. The magnetic assembly B comprises at least one (or a plurality of) permanent magnets 34, and the coil assembly A comprises a plurality of coils 24, so that the coil assembly A can cut the line of magnetic field of the permanent magnet 34 to form the change of magnetic flux and generate induced current during the relative rotation between the magnetic assembly B and the coil assembly A.

Figure 3C:
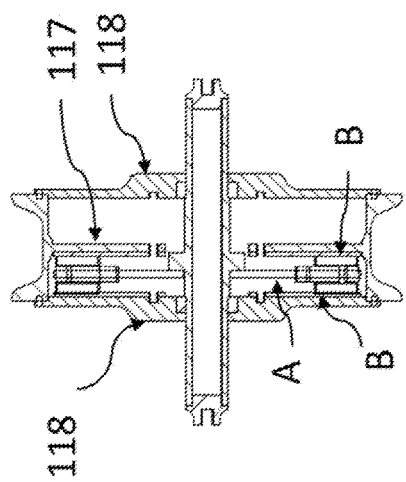
FIG. 3C illustrates a sectional view according to the A-A line of FIG. 3B.
Figure 3E:
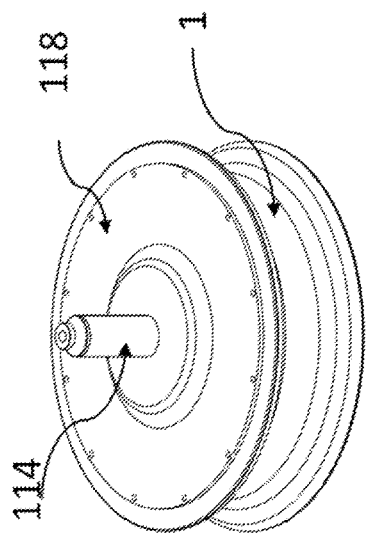
FIG. 3E illustrates a stereoscopic view of the hub of the invention.
Figure 3B:
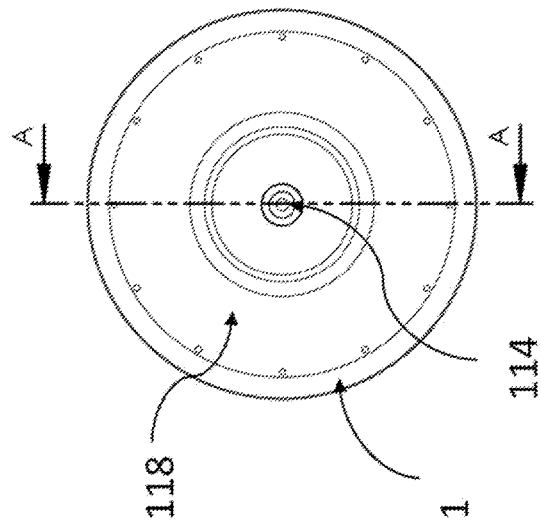
FIG. 3B illustrates a side view of the hub of the invention.
Figure 3D:
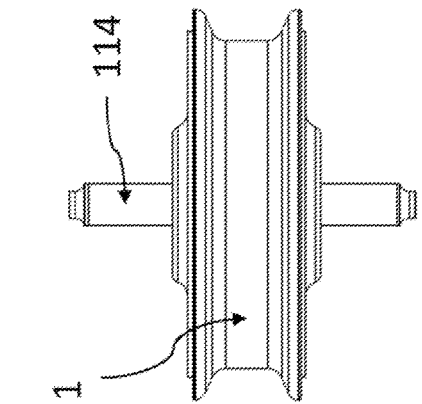
FIG. 3D illustrates a side view of the hub of the invention.

Referring to FIG. 3B, it illustrates a side view of the invention, which shows the hub housing structure 118 and the edge of the hub 1. FIG. 3C is a sectional view according to the A-A line of FIG. 3B. In one embodiment, the rotor and the stator are asymmetric to the hub configuration and deviate from the center tangent to one side, which is considering that the other side needs to be equipped with a braking system, such as a disc braking system, so an asymmetric design is adopted. FIG. 3D is a side view of FIG. 3A, and FIG. 3E is a stereoscopic view of FIG. 3A. The coil assembly A and the magnetic assembly B can be disc structure, and an appropriate number of minimum units can be configured based on the requirements and specifications of the application. According to different configurations, in order to distinguish the configuring order, it can be called the first disc, the second disc, the third disc . . . the n-th disc, and the required coil assembly A or magnetic assembly B is configured on the disc.

According to the embodiments shown in FIG. 1, FIGS. 2A-2D and FIGS. 3A-3E, in one embodiment of the present invention, the minimum unit of AB configuration of the induction power generation device is made by a magnetic assembly B combining with a coil assembly A, which is conducive to reducing the thickness of the induction power generation device so that it can be miniaturized. On the other hand, in another embodiment of the invention, the induction power generation device of the invention has a sandwich structure. For example, the minimum unit of ABA structure is a magnetic assembly B (disc), combining with two coil assemblies A on its left and right sides, wherein one magnetic assembly B is wrapped and clamped by the two coil assemblies A (ABA structure). When the electromagnetic induction device 10 operates, the magnetic field on both sides of the magnetic assembly is created so that the induced current will be generated by each coil assembly A on both sides of the left and right. Compared with the AB configuration, the current can be increased. Thus, when the vehicle is moving and the tire drives the rotor unit to rotate, its rotation for one circle (360°) can produce twice the induced current. Similarly, the invention can also adopt BAB structure. One coil assembly A corresponds to two magnetic assemblies B on its left and right sides. The two magnetic assemblies can create a vertical magnetic field perpendicular to the coil, and wrap the coil assembly A to form a sandwich structure to achieve the effect of vertical magnetic field. Because the induced current is directly proportional to the strength of the magnetic field, such configuration improves the change amount of magnetic flux of the coil assembly A in unit time, increases the induced current generated by the induction power generation device, and achieves the purpose of prolonging endurance of vehicle or increases energy efficiency of vehicle. The BAB configuration is superior than the ABA structure, not mentioned to the BA structure.

According to another aspect of the invention, in the electromagnetic induction device (10a) 10 shown in FIG. 1 and FIGS. 2A-2D, the one-to-two configuration can improve the efficiency of power generation. When the coil rotates, the magnetic force line formed by the permanent magnet can be cut, which can change the magnetic flux and then generate induced current. Therefore, in various configurations of embodiments of the invention, the magnetic assembly B and the coil assembly A may be applied to the stator unit or the rotor unit. That is, when the electromagnetic induction device 10 operates, the magnetic assembly B and the coil assembly A can be used as the stator unit or the rotor unit. Different configurations are selected according to the needs of the application of the electromagnetic induction device 10

(10a). In various embodiments of the invention, when the electromagnetic induction device 10 (10a) operates, its coil generates induced current according to Fleming's right-hand rule. Therefore, the invention can adopt AB configuration or sandwich configuration. An embodiment is shown in FIG. 3A. The coil assembly is a stator fixed to the rotating shaft 114, and two magnetic assemblies B (or two hub housing structures 118) are respectively engaged (connected) to the rotating shaft 114 through two bearings 117. In one embodiment, two magnetic assemblies B can be fixed on two hub housing structures 118 respectively, or one magnetic assembly B can be fixed on the hub housing structure 118, and the other magnetic assembly B can be fixed on the hub support structure 119 (which can be configured or removed depending on requirements).

Figure 4:
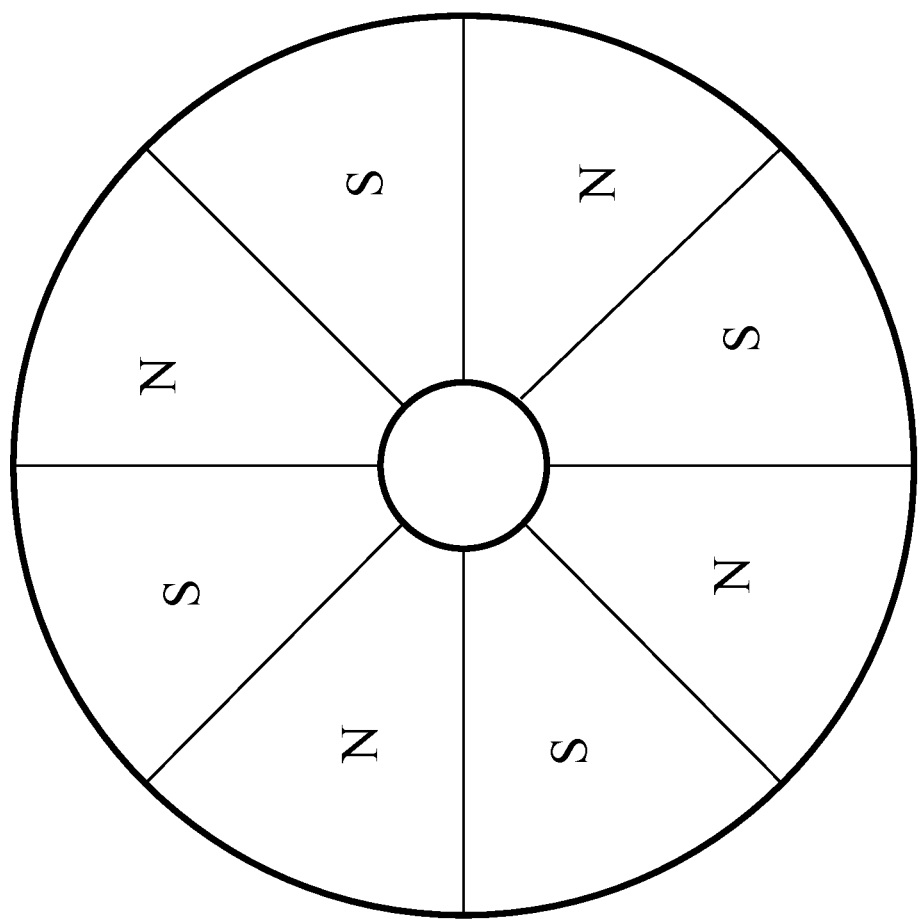
FIG. 4 illustrates a front view of a magnetic assembly of the present invention.

Referring to FIG. 4, the shape of magnetic pole can also be other configuration, such as the radial shape arranged from the center extension line, with equal radial angular distribution. The plurality of permanent magnets can be strip-shaped, fan-shaped or triangular, and their magnetic poles are arranged on the base in an axial radial arrangement (or embedded therein). The shape of the permanent magnet is such as circle, ellipse or rectangular. The magnetic poles of adjacent permanent magnets are arranged alternately in the opposite polarity, that is, the first type of magnetic polarity (e.g., N pole) and the second type of magnetic polarity (e.g., S pole) are arranged alternately. If the magnetic pole of any permanent magnet in the direction out of the paper is N pole or S pole, the polarity on the other side presents the opposite polarity.

Figure 6:
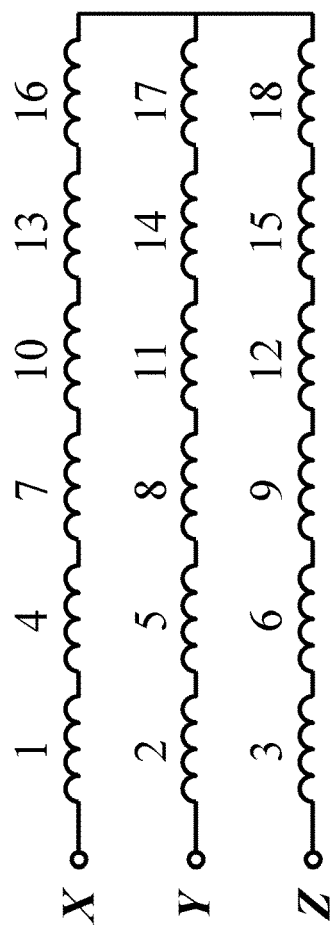
FIG. 6 illustrates a connection of a three-phase coil of a coil assembly B according to an embodiment of the present invention.
Figure 5:
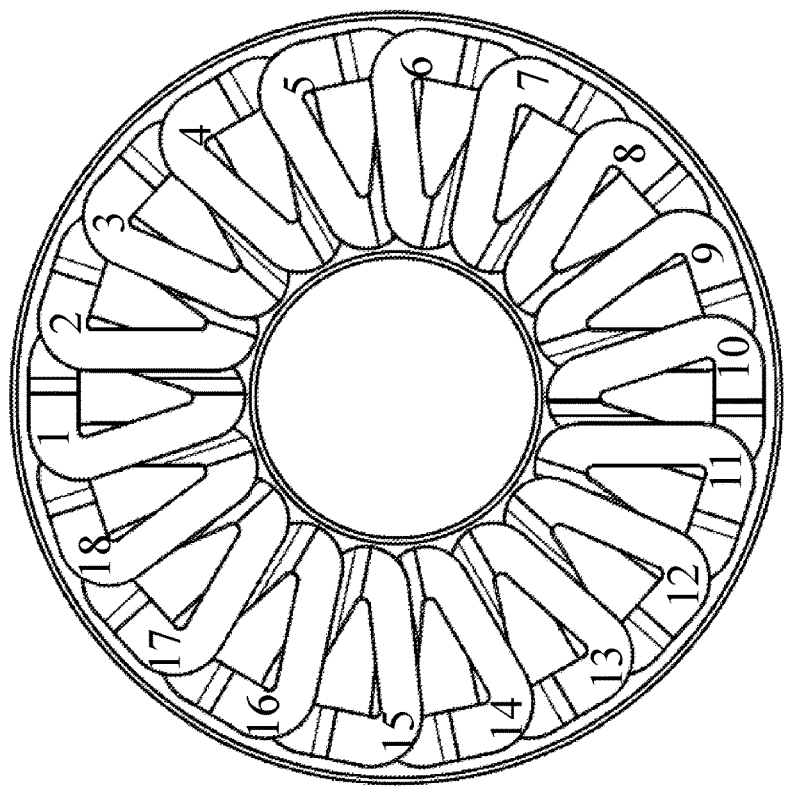
FIG. 5 illustrates a configuration diagram of a three-phase coil of a coil assembly B according to an embodiment of the present invention.

FIG. 5 shows a configuration diagram of a three-phase coil of a coil assembly B according to an embodiment of the present invention. The connection of three-phase coils X, Y and Z is shown in FIG. 6, wherein the number in the diagram represents the individual coil 24 located in the base 22. Coils 1, 4, 7, . . . are connected in series, coils 2, 5, 8, . . . are connected in series, and coils 3, 6, 9, . . . are connected in series, which are arranged along the circumference. Among them, the three phases of the three-phase coil will have three groups of coils 24 in order to make the phase difference 120° (degree) of their alternating current from each other. The rule is that the coils 24 with intervals of three of number 1, 4, 7, 10 and 13 belong to the first group, the coils 24 with intervals of three of number 2, 5, 8, 11 and 14 belong to the second group, and the coils 24 with intervals of three of number 3, 6, 9, 12 and 15 belong to the third group. Those skilled in the art of the invention can know the configuration relationship of three-phase coils from the description of this invention and FIGS. 5-6.

The adjacent coils 24 can be partially overlapped due to the adjacent coils are different phase coils. Part of the surface area of each coil 24 will cover the surface area of the other adjacent coil 24, and each coil 24 can be arranged side by side with the adjacent coil 24 to form a compact packing. The coil 24 can be arranged to have their individual vertical bisector aligned with a set of radial axes (ax-1, ax-2, . . . ) of the coil base 22. In a preferred embodiment, each of the coils 24 is wrapped with enamel-insulated conducting wire to form an isosceles triangular shape (or similar shape, such as trapezoid shape). Each of the isosceles triangular shape (or trapezoid shape) coils 24 is arranged with its base facing the circular outer wall of the coil base 22. Once these coils 24 are configured on their correct positions in the coil base 22, a filler material (insulating and heat-conducting filler) 28, such as epoxy resin mixer, is filled with the gap (space) 26 therebetween for securing coils in place and improving coil's insulating and thermal properties (insulation and heat conduction). A plurality of coils 24 can be configured on both sides of the non-magnetic coil base 22 to increase the number of coils 24.

In the induction power generation device proposed by the invention, the coil assembly A with compact stacked coils 24 and the permanent magnet 34 in the magnetic assembly B can provide high-efficiency energy conversion without any laminated steel sheet for coil winding, and thereby reducing the overall weight of the electromagnetic induction device, and also reducing the material and economic cost required to make electromagnetic induction device. The built-in wheel hub is characterized by omitting the connection parts, that is, the connected shaft rod can be omitted to avoid wear, balance shaking, and there is no need to drive the far end through the connected shaft rod.

Figure 7:
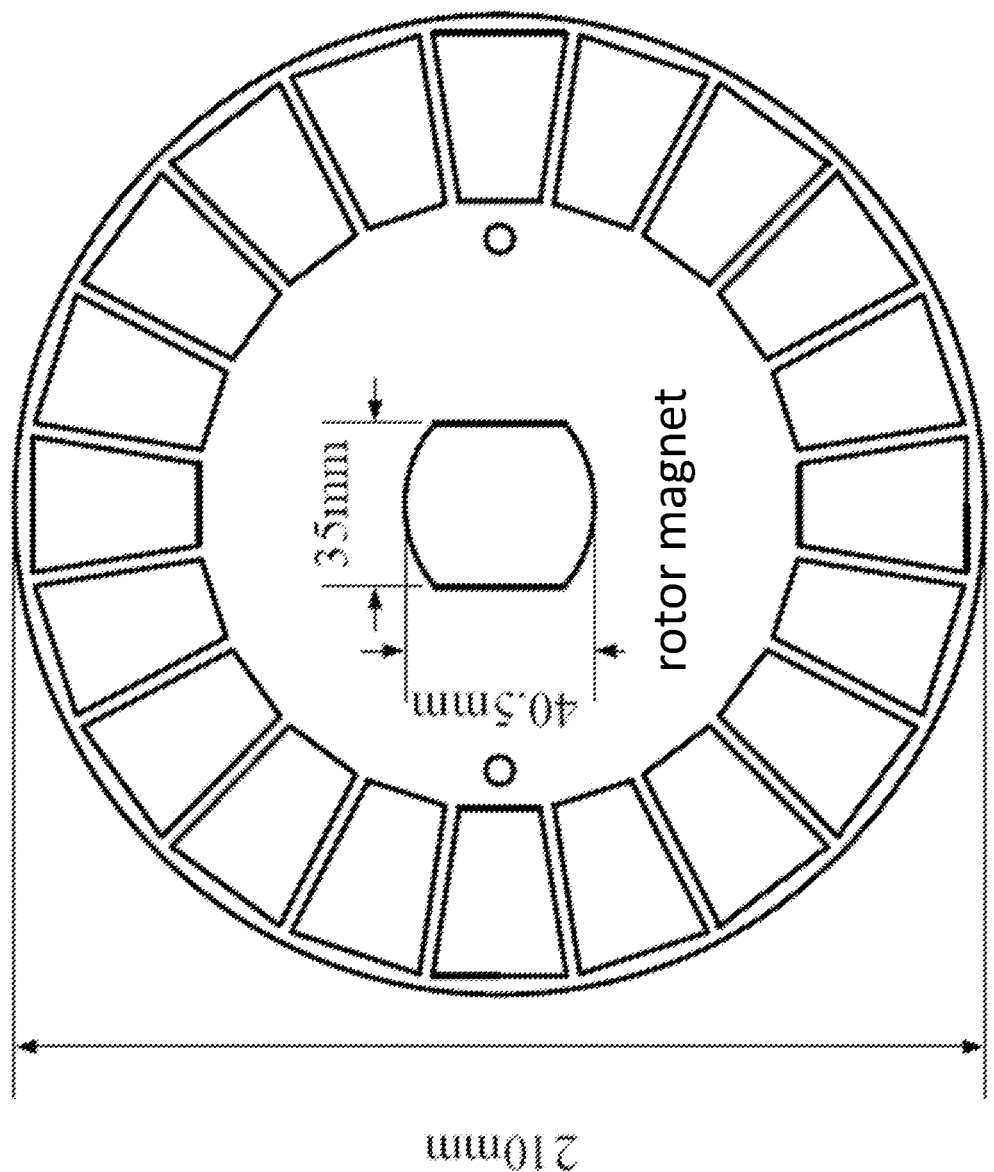
FIG. 7 illustrates a front view of a rotor with magnets of the present invention.

In one embodiment, the polarities of the rotor magnets on both sides are corresponding difference and adjacent difference, and the difference is N and S. There are 16-20 trapezoidal high magnetic force magnets on each side of the rotor, which are made of neodymium iron boron. There are 32-40 magnets on both sides. In one embodiment, the electric generator has 20 magnetic poles, as shown in FIG. 7. The stator is composed of coils and shaped resin or glass fiber. The coils are wound in an overlapping manner. The pitch factor of the coils is 1.0, across one pole, and the electrical degree between the coil edges is 180°. Since the electric generator has three-phase and 20 poles, there are 20 groups of coils in each phase, with a total of 60 groups of coils; 10 groups of coils per phase can also be used, with a total of 30 coil groups. The coil is made by an overlapping winding method, composed of two wires per unit. Each wire is made of copper, the wire diameter is 1.0 mm (millimeter), and the wiring is double Y wiring. There are 20 groups of coils in each phase, and the number of turns of each group of coils is 5 turns. Double Y-wiring is composed of 10 groups of coils per phase and the number of turns of each group of coils is 10 turns. The stator is a coil without iron core and fixed with resin.

Figure 8:
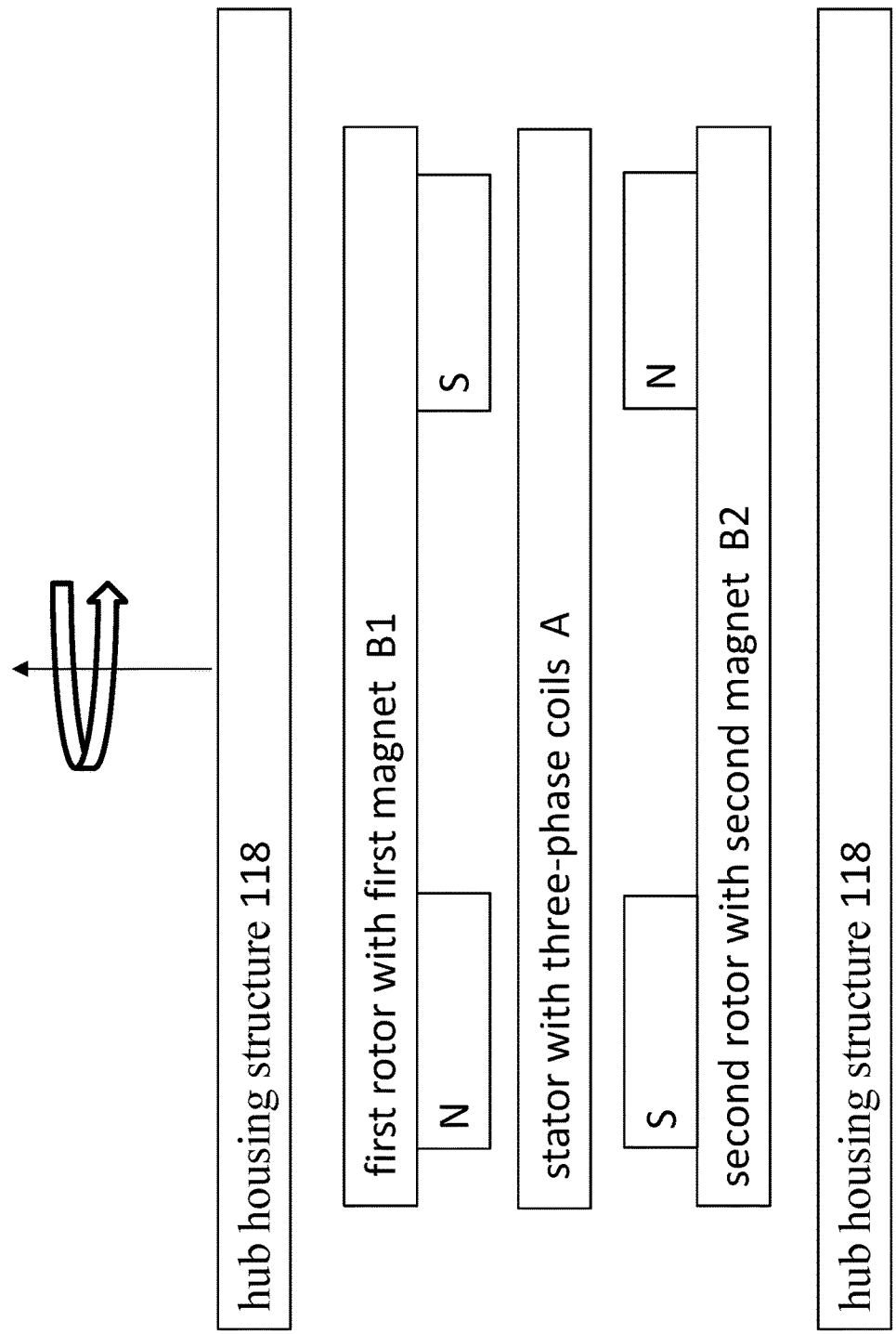
FIGS. 8 and 8A illustrate a cross-sectional view according to an embodiment of the present invention.
Figure 9:
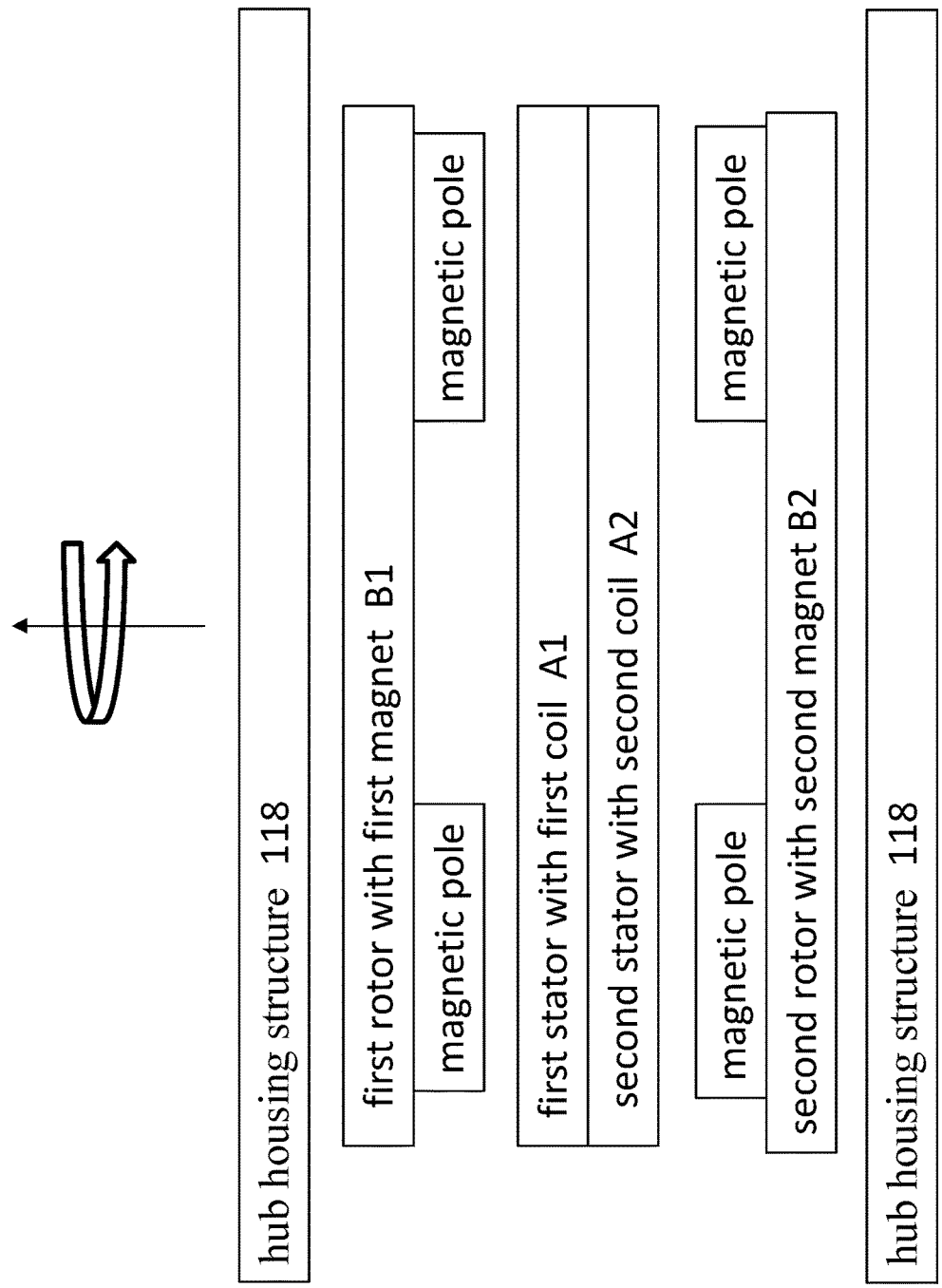
FIGS. 9 and 9A illustrate a cross-sectional view according to an embodiment of the present invention.

Referring to FIG. 8, it shows a cross-sectional view of the invention, having a first rotor B1 with a first magnet and a second rotor B2 with a second magnet which polarity is opposite to that of the first magnet, and the polarities of the adjacent plurality of magnets on the first rotor B1 with the first magnet and the second rotor B2 with the second magnet are interleaved as described above. The magnetic flux is generated by the magnet and the magnetic flux density of cross-sectional area of each polar is created. The rotor magnet rotates, the stator coil is fixed, so there is relative movement, and the arrangement of three-phase windings is differentiated by 120 degrees of electric angle. The upper and lower rotors must rotate synchronously. In another embodiment, a plurality of groups of coil discs can be configured between the first rotor B1 with the first magnet and the second rotor B2 with the second magnet, for example, a first stator A1 with a first coil and a second stator A2 with a second coil, as shown in FIG. 9. In the embodiments of FIG. 8 and FIG. 9, the first rotor B1 and the second rotor B2 rotate synchronously with the hub housing structure 118 and the tire.

Figure 8A:
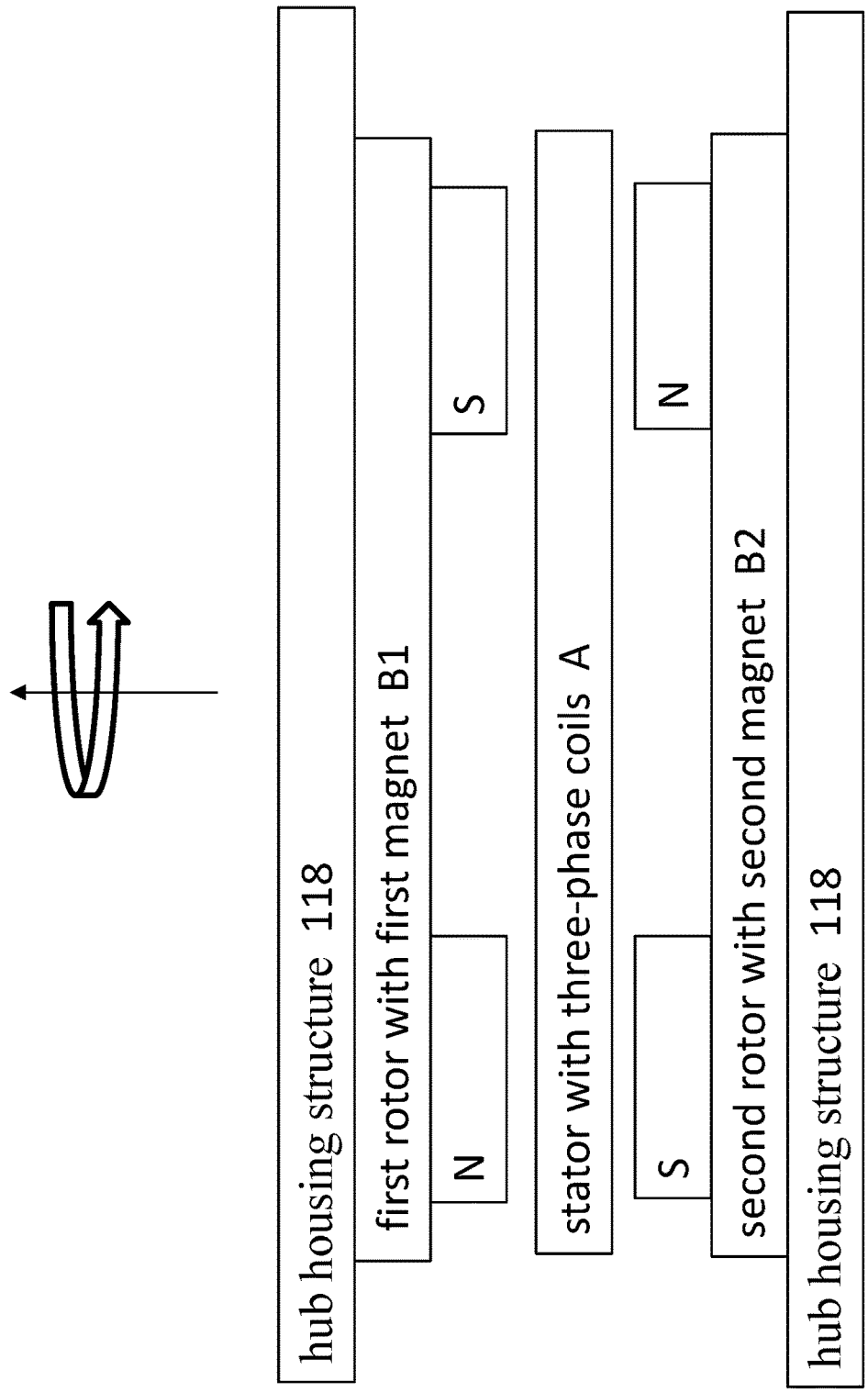
Figure 9A:
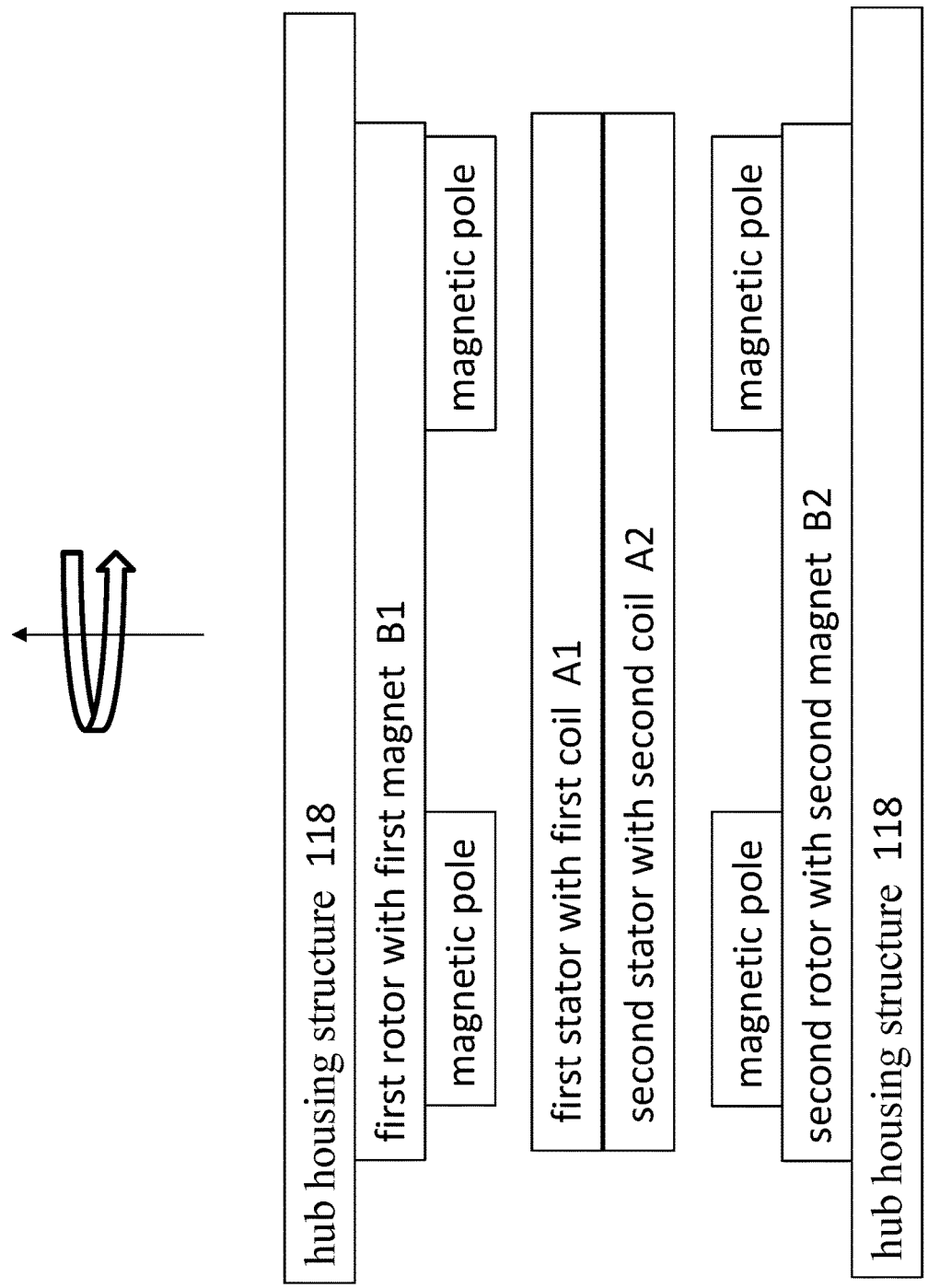

The rotor shown in FIG. 8 and FIG. 9 has a rotor base 32, which is made of magnetic conductive material and carries a plurality of permanent magnets 34. In another embodiment of the present invention, by adjusting the embodiment of FIG. 8 and FIG. 9, the two rotor bearings can be omitted, and the rotor base 32 of the permanent magnet 34 is configured on the inner side of the hub housing structure 118. In other words, the rotor base 32 is integrated on the hub housing structure 118. Referring to FIG. 8A and FIG. 9A, the configuration is generally similar to FIG. 8 and FIG. 9, having a first rotor B1 with a first magnet and a second rotor B2 with a second magnet which polarity is opposite to that of the first magnet, and the polarities of the adjacent plurality of magnets on the first rotor B1 with the first magnet and the second rotor B2 with the second magnet are interleaved. The arrangement of three-phase windings is differentiated by 120 degrees of electric angle. In this embodiment, the first rotor B1 and the second rotor B2 are integrated with the hub housing structure 118. In other words, the two rotors are configured on the inner side of the hub housing structure 118, and the two rotors rotate synchronously with the hub housing structure 118, saving two groups of bearings, improving the contact area of rotors and increasing the heat dissipation effect. In another embodiment, a plurality of groups of coil discs can be configured between the first rotor B1 with the first magnet and the second rotor B2 with the second magnet, for example, the first stator A1 with the first coil and the second stator A2 with the second coil, referring to FIG. 9A. The advantage of this embodiment is that the two bearings of the rotor base 32 are omitted, which can not only save the cost, but also reduce the weight. In addition, the plurality of permanent magnets 34 are respectively arranged on the inner sides of both sides of the hub housing structure 118, which can make the base 32 with the plurality of permanent magnets 34 contacts the hub housing structure 118, improve the surface area of heat dissipation and accelerate the heat dissipation effect, to avoid demagnetization effect caused by high temperature.

Figure 10:
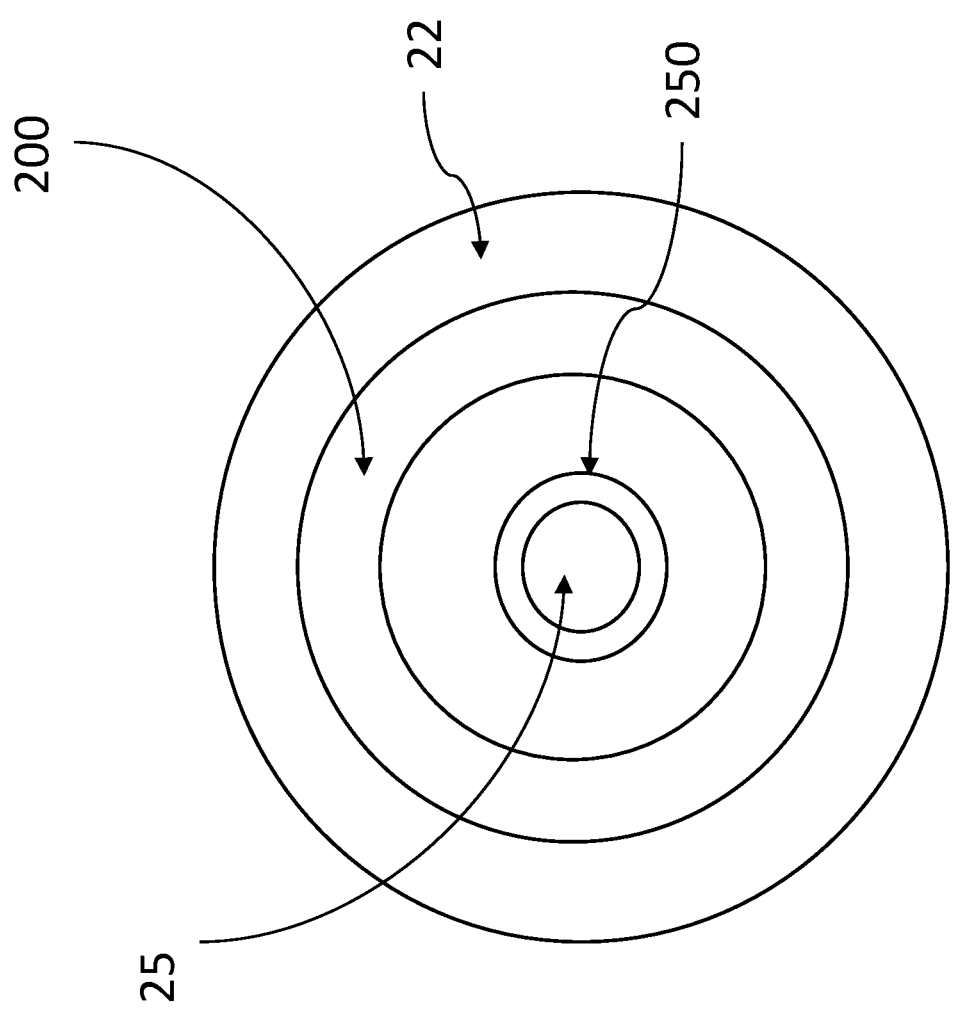
FIG. 10 illustrates a diagram of coil disc base with a heat dissipation device of the present invention.

FIG. 10 shows that the coil disc base 22 has a heat dissipation device or material 200. For example, the material can be graphite, graphene or carbon nanotube, and the heat dissipation device can be heat pipe. A buffer 250 is arranged around the central hole 25 and fixed on the rotating shaft to reduce vibration.

As will be understood by persons skilled in the art, the foregoing preferred embodiment of the present invention illustrates the present invention rather than limiting the present invention. Having described the invention in connection with a preferred embodiment, modifications will be suggested to those skilled in the art. Thus, the invention is not to be limited to this embodiment, but rather the invention is intended to cover various modifications and similar arrangements included within the spirit and scope of the appended claims, the scope of which should be accorded the broadest interpretation, thereby encompassing all such modifications and similar structures. While the preferred embodiment of the invention has been illustrated and described, it will be appreciated that various changes can be made without departing from the spirit and scope of the invention.

What is claimed is:

1. A power device in wheel, comprising:
a hub housing structure;
a rotating shaft penetrating said hub housing structure;
a first disc with a plurality of first permanent magnets;
a second disc configured to a first side of said first disc, wherein said second disc has a first coils, wherein said first coils include three phase coils having same phase connected in series, wherein said three phase coils are arranged along a circumference, wherein adjacent coils of said first coils are different phase coils; and
a third disc configured to a second side of said second disc, wherein said third disc has a plurality of second permanent magnets, wherein said rotating shaft penetrates said first disc, said second disc and said third disc, wherein said second disc is formed between said first disc and said third disc;
wherein N poles and S poles of said plurality of first permanent magnets are arranged alternately, and N poles and S poles of said plurality of second permanent magnets are arranged alternately.

2. The device of claim 1, wherein said first disc is a rotor, and wherein said second disc is a stator.

3. The device of claim 2, wherein said third disc is a rotor; wherein adjacent coils of said first coils are partially overlapped when said adjacent coils are different phase coils.

4. The device of claim 1, wherein said first disc is configured on a first side of said hub housing structure, and said third disc is configured on a second side of said hub housing structure.

5. The device of claim 1, further comprising a second coils to increase coil number, or a heat dissipation device configured on said second disc to avoid demagnetization effect caused by temperature.

6. The device of claim 1, wherein said first disc is configured on a first side of said hub housing structure, and said third disc is configured on a second side of a hub support structure.

7. The device of claim 1, wherein said first disc and said second disc are asymmetric to said rotating shaft.

8. The device of claim 1, wherein N poles of said plurality of first permanent magnets one-to-one correspond to S poles of said plurality of second permanent magnets.

9. The device of claim 1, wherein S poles of said plurality of first permanent magnets one-to-one correspond to N poles of said plurality of second permanent magnets.

10. An electromagnetic induction hub, A power device in wheel, comprising:
a hub housing structure;
a rotating shaft penetrating said hub housing structure;
a coil assembly configured to said rotating shaft, wherein said coil assembly has a first plurality of coils and a second plurality of coils formed on two sides of said coil assembly, wherein said coil assembly include three phase coils having same phase coils connected in series;
a first magnetic assembly and a second magnetic assembly respectively engaged to said rotating shaft by said hub housing structure or a hub support structure, wherein said coil assembly is configurated between said first magnetic assembly and said second magnetic assembly to form a sandwich structure;
wherein each one of said first magnetic assembly and said second magnetic assembly includes a plurality of permanent magnets;
wherein N poles and S poles of said plurality of permanent magnets are arranged alternately, wherein N poles of said plurality of permanent magnets on said first magnetic assembly are corresponded to S poles of said plurality of permanent magnets on said second magnetic assembly, wherein S poles of said plurality of permanent magnets on said first magnetic assembly are corresponded to N poles of said plurality of permanent magnets on said second magnetic assembly.

11. The device of claim 10, wherein said coil assembly is a stator.

12. The device of claim 11, wherein said first magnetic assembly and said second magnetic assembly are rotators.

13. The device of claim 10, further comprising a heat dissipation device configured on at least one of said first magnetic assembly and said second magnetic assembly to avoid demagnetization effect caused by temperature.

14. The device of claim 10, wherein said first magnetic assembly and said second magnetic assembly are asymmetric to said rotating shaft.

15. A power device in wheel, comprising:
- a rotor configured in a hub housing structure wherein said rotor includes a plurality of first permanent magnets, wherein said hub housing structure is configured in a wheel;
- a rotating shaft penetrating said hub housing structure and said rotor;
- a stator configured to said rotating shaft, wherein said stator includes three phase coils having same phase coils connected in series, wherein adjacent coils of said three phase coils are partially overlapped when said adjacent coils are different phase coils; and
- wherein N poles and S poles of said plurality of first permanent magnets are arranged alternately;
- wherein said rotor is rotated with said hub housing structure, and a braking system being configurated adjacent to said hub housing structure.

16. The device of claim 15, wherein said rotor further comprises a heat dissipation device to avoid demagnetization effect caused by temperature.

17. The device of claim 15, wherein said stator is asymmetric to said rotating shaft.

18. The device of claim 15, wherein said rotor having a plurality of second permanent magnets, wherein said plurality of first permanent magnets and said plurality of second permanent magnets are NdFeB permanent magnets.

19. The device of claim 18, wherein N poles of said plurality of first permanent magnets one-to-one correspond to S poles of said plurality of second permanent magnets.

20. The device of claim 18, wherein S poles and N poles of said plurality of second permanent magnets are arranged alternately.

* * * * *